United States Patent [19]

McMaster

[11] Patent Number: 4,738,705
[45] Date of Patent: Apr. 19, 1988

[54] GAS BURNER FORCED CONVECTION HEATING OF GLASS SHEETS

[75] Inventor: Harold A. McMaster, Woodville, Ohio

[73] Assignee: Glasstech, Inc., Perrysburg, Ohio

[21] Appl. No.: 42,590

[22] Filed: Apr. 15, 1987

Related U.S. Application Data

[63] Continuation-in-part of Ser. No. 869,426, Jun. 2, 1986, abandoned.

[51] Int. Cl.$^4$ ............................................. C03B 29/04
[52] U.S. Cl. ........................................ 65/119; 65/104; 65/107; 65/273; 65/350; 431/158; 431/173
[58] Field of Search ................. 65/104, 107, 273, 289, 65/290, 114, 119, 350; 431/158, 173

[56] References Cited
U.S. PATENT DOCUMENTS

| | | | |
|---|---|---|---|
| 3,223,498 | 12/1965 | Davidson, Jr. | 65/104 X |
| 3,463,601 | 8/1969 | Childree | 431/158 |
| 4,120,640 | 10/1978 | Martin | 431/173 X |
| 4,144,045 | 3/1979 | Starr | 65/111 X |

Primary Examiner—Arthur Kellogg
Attorney, Agent, or Firm—Brooks & Kushman

[57] ABSTRACT

A furnace (12) including a roller conveyor (18) and gas burners (20) distinct from the conveyor for supplying forced convection that is the dominant mode of heat transfer to glass sheets during a heating process. The gas burners (20) have general utility but have particular utility when utilized in a closely spaced relationship to the roller conveyed glass sheet to provide the forced convection heating. Each burner (20) includes a combustion member (38) defining an elongated combustion chamber (42) extending transversely to the direction of conveyance. Gas and air are introduced into the combustion chamber (42) in a tangential relationship with respect to its inner surface to provide a swirling motion that mixes the gas with the air for combustion prior to discharge through outlets (46) to provide the forced convection heating. A glass sheet heated by this gas burner forced convection on the roller conveyor and subsequently cooled has reduced roll-wave distortion and reduced edge distortion as compared to radiantly heated glass sheets.

17 Claims, 3 Drawing Sheets

GAS BURNER FORCED CONVECTION HEATING OF GLASS SHEETS

This is a continuation-in-part of co-pending application Ser. No. 869,426, filed on June 2, 1986, now abandoned.

TECHNICAL FIELD

This invention relates to: a gas burner heated and process for heating glass sheets by forced convection; a gas burner of a novel construction that has general usage but has particular utility when used to provide forced convection heating of glass sheets; and a glass sheet that has improved characteristics as a result of having been heated by the gas burner heater and process.

BACKGROUND ART

Heating of flat glass sheets is performed to provide bending, tempering, bending and tempering, heat strengthening, and pyrolytic filming, etc. Usually the glass is heated above its strain point which is the temperature at which the glass acts as a viscous fluid rather than an elastic solid. The heated glass sheets are thus easily subjected to unintended deformation when heated to the viscous condition, and great care must be taken if the glass sheets are to have the required optical quality after subsequent cooling.

Historically, most commercial heating of glass sheets until the early 1960s was performed by the vertical process where tongs are utilized to suspend the upper edge of the glass sheet which hangs downwardly and is conveyed through a heating chamber for the heating. One problem with this vertical process is that the entire weight of the glass sheet is supported by the tongs and, upon being heated sufficiently hot to become viscous, the glass sheets tend to deform at the tongs which leaves "tong marks" upon subsequent cooling. Also, furnace capacity can be wasted in the vertical process since short glass sheets require the same conveyor usage as long glass sheets.

U.S. Pat. No. 2,841,925 of McMaster and U.S. Pat. No. 3,402,038 of Hordis disclose glass tempering furnaces of the vertical type described above. Each of these vertical furnaces is disclosed as including fans for circulating gas to provide uniformity in the heating. However, in commercial units manufactured in accordance with these patents, the gas pressures utilized have been relatively low, only on the order of about one-half inch water column at the output of the fans. As such, the amount of forced convection is not particularly great and the dominant mode of heating is by radiation from the furance walls and other components of the furnace such as the fan blowers and associated baffle plates, etc.

In an attempt to overcome problems associated with vertical type furnaces for heating glass sheets, gas hearth furnaces were developed during the early 1960s. This gas hearth type of furnace includes a generally horizontal but slightly inclined hearth through which gas is supplied to provide a thin layer of gas on which the glass sheets are supported during heating. A pressurized plenum below the hearth supplies the gas through openings in the heart to support the glass sheets for conveyance. Recirculation of the gas between the furnace and the plenum provides the glass sheet support without heat loss that would result if the gas were allowed to escape to the atmosphere. At the lower edge of the tilted hearth, a movable frame is provided to provide movement of the glass sheets along the hearth on the thin layer of gas provided by the pressurized plenum. Heating of the glass sheet is thus performed by gas supplied by the hearth which constitutes a part of the conveyor of this type of furnace. Also, substantial radiant heat transfer takes place between the hearth and the lower surfaces of the glass sheets conveyed on the hearth. Substantial radiation also takes place between the furnace walls and the upper surfaces of the conveyed glass sheets. In addition, as disclosed by the U.S. Pat. No. 4,059,426 of Starr, gas heaters have previously been utilized to provide forced convection heating of the upper surfaces of the glass sheets.

Roller conveyor furnaces for heating glass sheets did not receive any widespread commercial acceptance until introduction of the frictionally driven roller conveyor furnace for heating glass sheets as disclosed by the U.S. Pat. No. 3,806,312 of McMaster and Nitschke. Thereafter, further commercial acceptance of roller conveyor furnaces for heating glass sheets was achieved upon introduction of the furnaces disclosed by the U.S. Pat. Nos. 3,934,970 and 3,947,242 of McMaster and Nitschke. Subsequently, the oscillating type of roller conveyor furnace for heating glass sheets, as disclosed by the U.S. Pat. No. 3,994,711 of McMaster, received further commercial acceptance. All of these roller conveyor furnaces utilized electric resistance heaters for providing radiant heat transfer as the dominant mode of heating the glass sheets.

U.S. Pat. Nos. 4,505,671 and 4,529,580 of McMaster disclose glass sheet heating by the use of forced convection. In U.S. Pat. No. 4,505,671 to McMaster, the forced convection heating is disclosed as providing glass temperature control that maintains planarity of glass sheets during tempering. In U.S. Pat. No. 4,529,580 to McMaster, the forced convection heating is disclosed as providing the primary source for heating the furnace in which glass sheets are heated prior to quenching that tempers the glass sheets.

In glass sheet radiant heating, radiant energy emitted from electric resistive elements operating in the 650 to 750 degree Centigrade temperature range is primarily absorbed by a thin layer of the glass surfaces. Therefore, the edges which are heated by three surfaces will become hotter than the central areas which are heated by only two surfaces. During subsequent cooling, the hotter edges will cool faster than the center since the cooling rate is proportional to the temeperature differential between the glass and the ambient air or the quenching air if the glass is to be tempered. The faster cooling tensions the glass edges relative to the center such that tension cracks tend to result. When glass is being quenched for tempering, almost all quench breakage starts at the glass edges. Reducing the probability of edge breakage by forced convection heating, which does not overheat the edges, allows tempering to be accomplished at a lower overall temperature. Lowering the temperature by only about 10 degrees Centigrade during tempering doubles the stiffness of the glass and thereby reduces distortion of the tempered glass.

Also, roller conveyor heating of glass sheets necessarily involves a certain amount of increased lower surface heating due to radiation and condition from the rolls. Upon subsequent quenching to provide tempering of the heated glass sheets, the hotter bottom surface will shrink more than the top surface if the heat transfer rates on the two surfaces are identical. This hotter bottom surface causes the glass to arch upwardly in the center if equal pressure of quenching gas is supplied from both above and below. As such, increased pressure must be utilized at the bottom surface, which results in the glass sheet curling down around its edges and thereby distorting planarity. While this "edge" distortion problem is present at all edges of the glass sheet, it is a particular problem at the leading edge that initially enters the quench station before the rest of the glass sheet.

DISCLOSURE OF INVENTION

One object of the present invention is to provide an improved gas burner heater and process for heating glass sheets by forced convection as the dominant mode of heat transfer.

Another object of the invention is to provide an improved gas burner that has general usage but has particular utility when utilized to heat glass sheets, especially when the heating is performed on a roller conveyor.

A further object of the invention is to provide an improved glass sheet that has reduced distortion as a result of the manner in which the glass sheet is processed.

In carrying out the above objects, an elongated glass sheet heater constructed in accordance with the present invention includes a roller conveyor for engaging and conveying flat glass sheets along a plane of conveyance. A plurality of gas burners are spaced from each other along the length of the conveyor in upper and lower sets on both sides of the plane of conveyance. Each gas burner includes a combustion chamber that extends transversely to the direction of conveyance and in which combustion takes place. Each combustion chamber has outlets positioned relatively close to the conveyed glass sheets to permit the products of combustion to flow outwardly from the combustion chamber to supply a heated gas flow that impinges on the conveyed glass sheets from both sides thereof to provide forced convection that is the dominant mode of heat transfer to the conveyed glass sheets.

Utilizing forced convection as the dominant mode of heat transfer permits lower energy cost as compared to conventional radiant glass sheet heating. In addition, the forced convection allows the glass sheets to be heated along a shorter length of conveyance since the heat transfer takes place faster than the radiant glass sheet heating. lower sets of gas burners include adjustable supplies of gas and air to independently control the extent the upper and lower glass surfaces are heated. Also, the upper and lower sets of burners are preferably aligned with each other at each spacing between the conveyor rolls.

The construction of the gas burner disclosed has general usage but has particular utility when utilized to provide forced convection heating of roller conveyed glass sheets. This burner construction includes a combustion member having an inner surface that defines the combustion chamber. At least one inlet is provided through which gas and air are introduced into the combustion chamber in a tangential relationship with respect to the inner surface to provide a swirling motion that mixes the gas with the air within the chamber for smooth, quiet combustion. Without the swirling action, the burners pulsate and are difficult to keep lit.

In the preferred construction, the combustion member of each burner comprises an elongated combustion tube whose inner surface has a round cross section. A plurality of the inlets are provided in the combustion tube spaced along its length with the inlets extending tangentially with respect to the round inner surface. The of outlets are provided in the combustion tube spaced along its length in a staggered relationship with respect to the inlets. The number of outlets provided is preferably greater than the number of inlets such that each inlet supplies gas and air to be burned into products of combustion for delivery through more than one outlet. There are most preferably at least twice as many outlets as inlets for the combustion chamber of each burner, and the inlets and outlets are positioned in the staggered relationship such that each inlet supplies gas and air for combustion and delivery through at least one associated outlet and also supplies gas and air for combustion and delivery through at least one other outlet along with the gas and air supplied therefor by an adjacent inlet. Best results are achieved in the burner disclosed when there are three times as many outlets as inlets for the combustion chamber of each burner. With this construction, each inlet supplies gas and air for combustion and delivery through two associated outlets and also supplies gas and air for combustion and delivery through two other outlets along with gas and air supply for the two other outlets by the two adjacent inlets.

With the burner construction described above, the products of combustion delivered through each set of three outlets are of generally equal temperatures at each outlet. During experimentation, an attempt to supply more than three outlets per inlet resulted in the outlets most remote from the inlets supplying cooler products of combustion than the outlets closer to the inlets. Likewise, attempts to supply a long row of nozzles connected by a manifold to a remote heat source results in large variations in the temperature along the manifold. As such, the disclosed construction is preferred by virtue of the uniformity of temperature that results in supplying the forced convection by the burners.

In the preferred construction, the burner also includes a plurality of supply tubes for respectively supplying gas and air to the inlets of the combustion chamber and further includes a manifold that feeds gas and air to the supply tubes for flow to the combustion chamber.

In one preferred embodiment, the glass sheet heater includes a furnace defining a heating chamber through which the conveyor extends and in which the gas burners are received. Also, the manifold of each burner includes insulation for controlling heat flow to the gas and air supplied thereby for subsequent combustion in the combustion chamber. The combustion member preferably provided by the elongated tube is made of stainless steel in order to withstand the temperatures involved with heating of glass sheets to a sufficiently high temperature for bending or tempering.

In an alternate embodiment, the furnace defines a heating chamber through which the conveyor extends and in which the combustion tube of each burner is received. The supply tubes of each gas burner extend from the combustion tube thereof out of the furnace, and the manifold of each burner is located externally of the furnace to thereby control heat flow to the gas and air being supplied thereby for subsequent combustion and delivery to provide the forced convection heating of glass sheets conveyed on the conveyor within the furnace.

In the preferred construction of both embodiments, the manifold of each burner includes an outer member into which the supply tubes extend. An inner member of the manifold is received within the outer member and has openings located in proximity to the supply tubes. An inlet is provided for supplying gas to one of the members of the manifold, and another inlet is provided for supplying air to another member of the manifold such that the supply tubes feed both gas and air to the combustion chamber. As disclosed, the inner member of the manifold includes the gas inlet and the outer member thereof includes the air inlet. This construction permits the gas inlet of the inner member to feed gas to each supply tube within a concentric blanket of air fed thereto by the air inlet of the outer member. Such flow of the gas within the concentric blanket of air within each supply tube prevents premature ignition before reaching the combustion chamber defined by the combustion tube.

Both the outer and inner members of the manifold preferably comprise tubes that extend parallel to the combustion tube. The supply tubes project into the outer tube into proximity with the opening in the inner tube. Opposite ends of the supply tubes are suitably secured to the manifold and the combustion tube with the supply tubes extending parallel to each other between the manifold and the combustion tube.

A process for heating a glass sheet in accordance with the invention involves conveying the glass sheet by a roller conveyor along a plane of conveyance between upper and lower sets of gas burners spaced in a close relationship to the plane of conveyance and spaced from each other along the length of the conveyor on both sides of the plane of conveyance. Gas is burned within a combustion chamber of each burner to supply heated gas flow through outlets of the combustion chamber toward the plane of conveyance in order to impinge on the glass sheets in order to provide forced convection that is the dominant mode of heat transfer to the conveyed glass sheet.

In performing the glass sheet heating process, the upper and lower sets of burners have adjustable supplies of gas and air to permit independent adjustment of the extent of heating of the upper and lower glass surfaces. Thus, the upper and lower sets of burners can be adjusted to deliver more heat to the upper glass surface in order to balance the effect of conduction heating of the bottom glass surfaces from the conveyor rolls.

Best results are achieved in the glass sheet heating process when gas and air are supplied to the combustion chamber of each burner in a tangential relationship to the combustion chamber. As previously discussed in connection with the description of the gas burner, supplying the gas and air in this tangential relationship provides a swirling motion that mixes the gas and air for smooth combustion over a wide range of pressures near each inlet.

The invention also involves the resultant product which is a glass sheet that has been heated while conveyed on rolls of a roller conveyor and subsequently cooled. In accordance with the invention, the glass sheet has reduced roll-wave distortion and reduced edge distortion as compared to glass sheets heated primarily by radiant heat. This reduction in both the roll-wave and edge distortion of the glass sheet results from the manner in which the glass sheet is heated by forced convection from gas burners as the dominant mode of heat transfer to the glass sheet during conveyance thereof on the rolls of the roller conveyor.

The objects, features, and advantages of the present invention are readily apparent by the following detailed description of the best modes for carrying out the invention when taken in connection with the accompanying drawings.

BEST MODES FOR CARRYING OUT THE INVENTION

Figure 1:
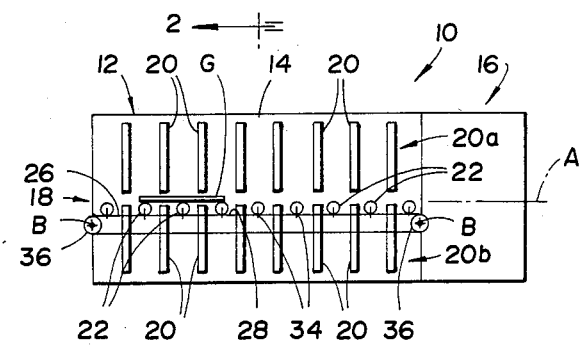
FIG. 1 is a schematic view of a glass sheet processing system including a heating furnace constructed in accordance with the present invention.

As illustrated in FIG. 1 of the drawings, a glass sheet processing system is generally indicated by reference numeral 10 and includes a glass sheet heating furnace 12 that is constructed in accordance with the present invention. Furnace 12 includes a heating chamber 14 in which heating is performed as is hereinafter more fully described. System 10 also includes a processing station 16 for processing heated glass sheets to provide tempering, heat strengthening, bending, bending and tempering, or pyrolytic filming, etc.

Figure 2:
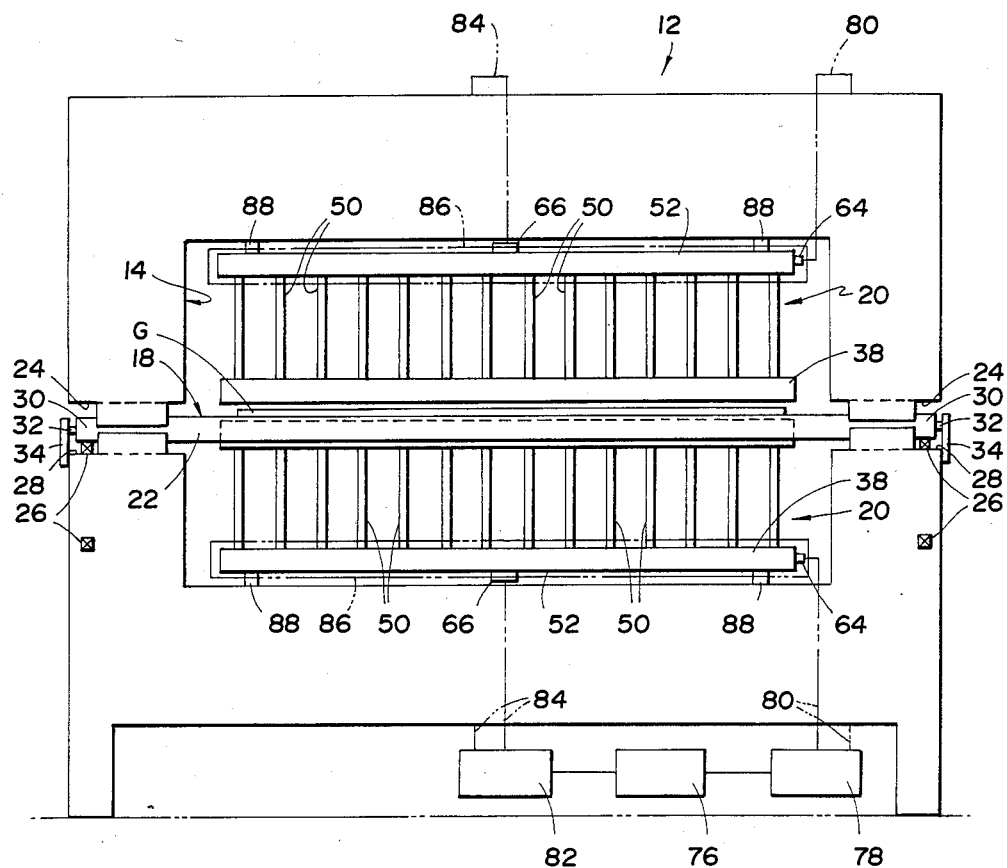
FIG. 2 is a cross sectional view taken through the furnace along the direction of line 2—2 in FIG. 1.

With combined reference to FIGS. 1 and 2, the glass sheet heating furnace 12 includes a conveyor 18 for conveying glass sheets G within the heating chamber 14 along a plane of conveyance that is schematically indicated by A. Furnace 12 includes a convection heater having a plurality of gas burners 20 that are distinct from the conveyor 16 and positioned within the heating chamber 14 along the length of the conveyor on both sides of the plane of conveyance A. As is hereinafter more fully described, the gas burners 20 are positioned relatively close to the conveyed glass sheet and supply heated gas flow toward the plane of conveyance A from both sides thereof to provide forced convection that is the dominant mode of heat transfer to the glass sheets.

Distinct advantages are achieved by the furnace 12, by providing forced convection as the conveyed dominant mode of heat transfer for heating the glass sheets, i.e., providing at least 50% of the total heat supplied to the glass sheets and, more preferably, at least about $\frac{2}{3}$ to $\frac{3}{4}$ of the total heat supplied to the glass sheet. More efficient heating is involved with forced convection as the dominant mode of heat transfer such that lower energy cost goes into each processed glass sheet. Also, the heating takes place faster with forced convection as the dominant mode of heat transfer to the glass sheet in order to permit the furnace to be shorter and thereby reduce construction cost as well as the factory floor space necessary to perform the processing.

The conveyor 18 is of the roller type including horizontally extending rolls 22 on which the glass sheets G are conveyed during the forced convection heating. As previously mentioned, the convection heater is embodied by gas burners 20 that burn combustible gas and air. These gas burners 20 are arranged in upper and lower sets 20a and 20b spaced from each other along the length of the conveyor above and below the conveyor rolls 22 as shown in FIG. 1. The upper and lower burners 20 are aligned with each other at the spacing between each adjacent pair of rolls 22 and respectively provide upward and downward gas flows that provide the forced convection heating as the dominant mode of heat transfer to the conveyed glass sheets and allow the balancing of top and bottom surface heat transfer from all sources.

Particular advantages result, in addition to the efficiency and faster heating times mentioned above, by the manner in which the glass sheets are heated on the roller conveyor 18 by the forced convection provided by gas burners 20. Since radiation is not the dominant mode of heat transfer to the glass sheets, the edges do not overheat by radiation due to the increased surface area adjacent the edges as compared to the center of the glass sheet. This allows tempering to be performed at a lower overall temperature and there is thus less chance for roll-wave distortion of the heated glass sheet as compared to radiant heating where the overall temperature must be higher. Furthermore, the upper and lower surfaces of the glass sheet can be heated more equally throughout the cycle with forced convection as the dominant mode of heat transfer. When tempering is to be performed, the bottom surface which is usually heated higher than the top surface in radiant heating furnaces must necessarily be quenched to a greater extent than the top surface. Such differential quenching causes the glass to curl downwardly around its edges, particularly at the leading edge, and thereby distorts planarity. When the final temperatures of the upper and lower glass surfaces are equal, the upper and lower quench rates can also be equal. Thus, both roll-wave and edge distortion are substantially reduced by utilizing forced convection as the dominant mode of heat transfer in accordance with the present invention.

Roll conveyor 18 illustrated in FIGS. 1 and 2 is preferably of the frictionally driven type disclosed by U.S. Pat. Nos. 3,806,312, 3,934,970, 3,947,242, and 3,994,711. At each of its lateral sides, the furnace 12 includes a side slot 24 (FIG. 2) through which the conveyor roll 22 projects for frictional driving. Each lateral side of the furnace 12 includes a continuous drive loop 26 and also includes an external support surface 28 that faces upwardly with an upper driving reach of the drive loop 26 supported thereon for movement along the length of the conveyor. The opposite roll ends 30 are supported on the upper driving reach of the drive loop 26 and include central end pins 32 that are received by longitudinal positioners 34 projecting upwardly from the associated support surface 28 to prevent movement of the conveyor rolls 22 along the length of the conveyor during frictional driving of the rolls. Each drive loop 26 is received by an associate pair of drive sprockets 36 (FIG. 1) which are rotatable about associated axes B to move the drive loops 26 and thereby provide the frictional driving of the conveyor rolls. Counterclockwise driving of the left sprocket 36 pulls the upper driving reach of the drive loop 26 over the support surface 28 to thereby rotate the conveyor rolls 22 clockwise and effect conveyance of glass sheets from the left toward the right. During such driving, the lower reach of the drive loop 26 moves from the left sprocket 36 toward the right sprocket 36. Similarly, right to left conveyance is effected by driving the right sprocket 36 in a clockwise direction if the conveyance is to be of the oscillating type as disclosed by the previously mentioned U.S. Pat. No. 3,994,711.

Figure 3:
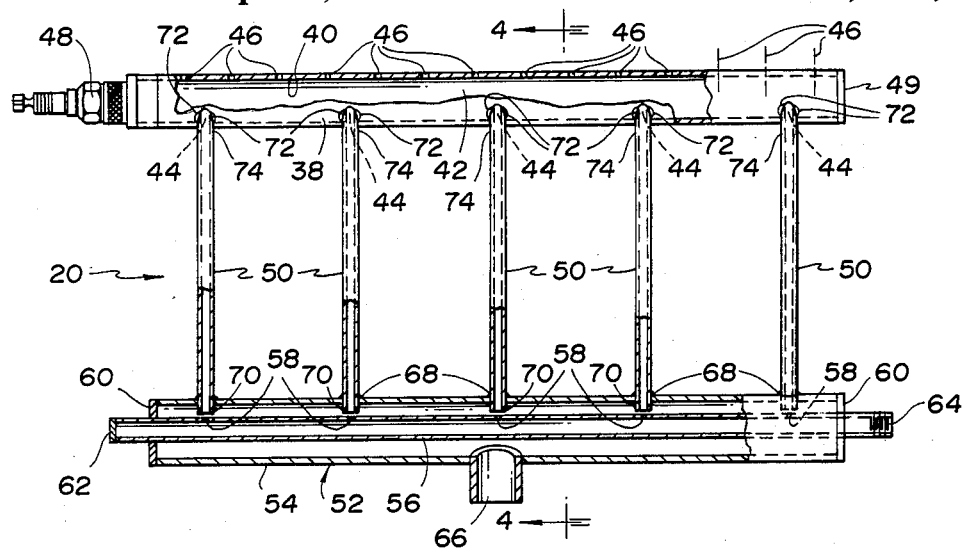
FIG. 3 is a partial sectional view of a gas burner that is constructed in accordance with the present invention and has general utility but has particular utility in heating of glass sheets within a furnace of the type disclosed by FIGS. 1 and 2.
Figure 4:
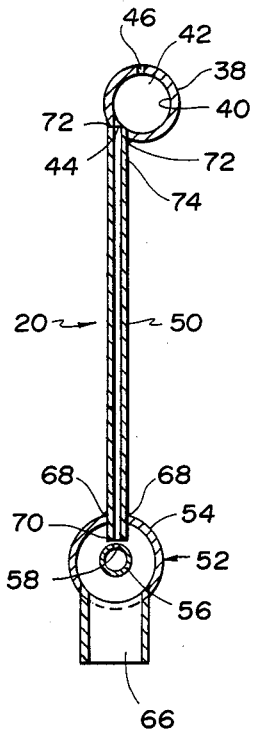
FIG. 4 is a sectional view of the burner taken along the direction of line 4—4 in FIG. 3.

With reference to FIGS. 2, 3, and 4, the construction of the burner 20 disclosed has general usage but has particular utility when utilized to provide heating of roller conveyed glass sheets as previously described, especially when used with the furnace 12 disclosed in FIGS. 1 and 2. This construction of the burner 20 includes a combustion member 38 having an inner surface 40 that defines an elongated combustion chamber 42 that extends transversely to the direction of conveyance of conveyor 18. Combustion member 38 is provided with at least one inlet 44 through which combustible gas and air are introduced into the combustion chamber 42 in a tangential relationship with respect to the inner surface 40. Such introduction of the gas and air in this tangential relationship provides a swirling motion that mixes the gas with the air within the chamber for pulse free combustion over wide ranges of pressures. Combustion member 38 is also provided with at least one outlet 46 from the combustion chamber through which heated gas flow therefrom is discharged. A spark plug 48 is provided on one end of the combustion member 38 as shown in FIG. 3 to initially start the burning of gas and air mixed by the swirling motion. Thereafter, the flame of the mixed gas and air is self-sustaining to provide the heated gas flow through each outlet 46. On its other end, combustion member 38 has an end plate 49 suitably secured thereto such as by welding to close the chamber 42. Each plate 49 can also support a flame detector, such as a flame rod, for safe operation.

As best illustrated in FIGS. 3 and 4, the combustion member 38 of the burner 20 preferably comprises an elongated combustion tube whose inner surface has a round cross section. Combustion tube 38 has a plurality of the inlets 44 spaced along its length and also has a plurality of the outlets 45 spaced along its length in a staggered relationship with respect to the inlets 44. There are preferably a greater number of outlets 46 than inlets 44 such that each inlet supplies gas and air for more than one outlet.

As best seen in FIG. 3, there are at least twice as many outlets 46 as inlets 44 for the combustion chamber 42 of the burner 20. Furthermore, the inlets 44 and outlets 46 are positioned in the staggered relationship such that each inlet burns gas and air for at least one associated outlet and also burns gas and air for at least one other outlet along with the gas and air burned therefor by an adjacent inlet. Best results are achieved when there are three times as many outlets 46 as there are inlets 44 for the combustion chamber 42 of each burner 20. Each inlet 44 burns gas and air for two associated outlets 46 and also burns gas and air for two other outlets along with gas and air burned for the two other outlets by the two adjacent inlets.

As illustrated in FIGS. 2 and 3, the construction of burner 20 includes a plurality of supply tubes 50 for respectively supplying gas and air to the inlets of the combustion chamber in the tangential relationship previously described for combustion adjacent each inlet 44. A manifold generally indicated by 52 feeds gas and air to the supply tubes for flow to the combustion chamber for combustion.

Reference should be made to FIGS. 3 and 4 which illustrate the construction of the manifold 52. As will be noted, manifold 52 includes an outer member 54 into which the supply tubes 50 extend. An inner member 56 of the manifold 52 is received within the outer member 54 and has openings 58 located in proximity to the supply tubes which are slightly spaced from the inner member. End plates 60 are secured in a suitable manner such as by welding to the opposite ends of the outer manifold member 54. Likewise, an end plate 62 closes one of the ends of the inner member 56 while an inlet 64 is provided at its other end in order to permit the introduction of pressurized combustible gas into the inner member for flow through the openings 58 into the supply tubes 50. Outer member 54 of the manifold 52 has an inlet 66 through which pressurized air is introduced into the manifold for flow into the supply tubes 50 along with the gas supplied through the openings 58 of the inner member 56. It is believed that the gas and air supplied in this manner flow in a generally segregated manner with the gas in a central flow and the air flowing in a blanket around the gas without substantial mixing to thereby prevent premature ignition until being tangentially introduced into the combustion chamber 42 where the swirling motion provides the mixing for combustion adjacent each inlet 44 as previously described.

In the preferred construction, the outer and inner members 54 and 56 of the burner manifold 52 comprise concentric tubes that extend parallel to the combustion tube 38. The supply tubes 50 are secured by suitable welds 68 to the outer member 54 of the manifold with the adjacent tube end 70 projecting into the outer member into proximity with the aligned opening 58 in the inner member 56 of the manifold. Likewise, welds 72 secure the opposite ends 74 of supply tubes 50 to the combustion member 38 in order to provide the inlets 44 that introduce the gas and air into the combustion chamber 42 in the tangential relationship that provides the swirling motion for mixing the gas and air. Between the combustion member 38 and the manifold 52, supply tubes 50 extend in the parallel relationship best illustrated in FIGS. 2 and 3.

With reference to FIG. 2, a central control 76 provides control of the forced convection heating in the furnace 12 by the gas burners 20. A suitable source 78 of pressurized combustible gas is operated by the control 76 and feeds the gas through separate conduits 80 to the gas inlets 64 of the burner manifolds 52. The source 78 is adjustable to provide independently adjustable supplies of gas to the upper and lower sets of burners in order to permit adjustment of one burner set with respect to the other. Likewise, a suitable source 82 of pressurized air is controlled by the central control 76 and feeds the pressurized air through conduits 84 to the air inlets 66 of the burner manifolds 52. The source 82 is also adjustable to provide independently adjustable supplies of air to the upper and lower sets of burners in order to permit adjustment of one burner set with respect to the other. Control of the gas and air supply by the central source 76 permits the proper proportioning of gas and air for most efficient operation and also permits adjusting of the extent of upper and lower air and gas flows with respect to each other to control the extent the upper and lower glass surfaces are heated such as to account for the conduction heating of the lower glass surface by the conveyor rolls. Also, the manifold 52 of each burner 20 is preferably enclosed within suitable insulation 86 to prevent premature heating of the gas and air prior to combustion. Suitable adjustable supports 88 position the burners within the burner heating chamber 14 so that the combustion tubes 38 are equally spaced from the conveyed glass sheet G in order to provide uniform heating of both the top and bottom surfaces. Adjustment of the supports 88 in any suitable manner permits the equally spaced relationship to be maintained such as when the thickness of the glass being heated is changed and it is thus necessary to change the elevation of either the upper or lower sets of burners.

Figure 6:
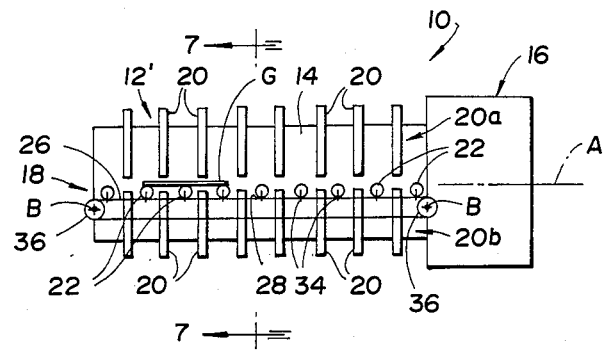
FIG. 6 is a schematic view of a glass sheet processing system including an alternate embodiment of a heating furnace constructed in accordance with the present invention.
Figure 7:
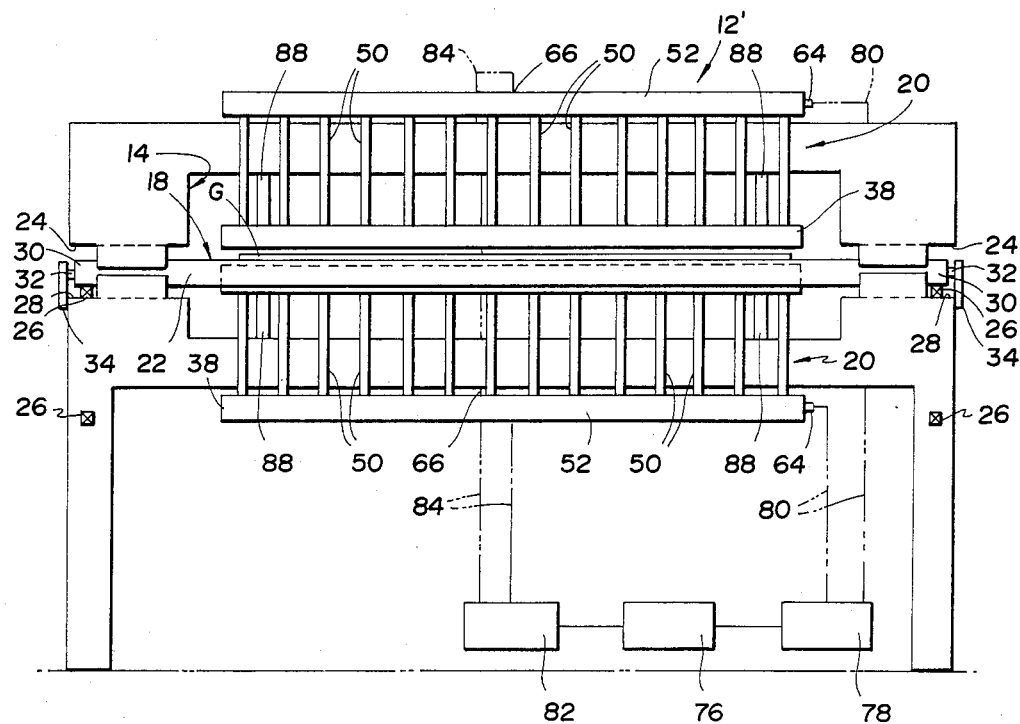
FIG. 7 is a cross sectional view taken through the alternate embodiment of the furnace along the direction of line 7—7 in FIG. 6.

With reference to FIGS. 6 and 7, the processing system 10 includes an alternate furnace embodiment 12' which is the same as the previously described embodiment except as will be noted such that like reference numerals are applied to like components thereof and the description thereof need not be repeated. In the alternate embodiment, the furnace 12' defines a heating chamber 14 through which the conveyor 18 extends and in which the combustion tube 38 of each gas burner 20 is received in the same manner as the previously described embodiment. However, the supply tubes 50 of each gas burner 20 extend from the combustion tube 38 thereof out of the furnace 12' as best shown in FIG. 7. The manifold 52 of each burner 20 is located externally of the furnace 12' to thereby control heat flow to the gas and air being supplied by the manifold for subsequent combustion. It will also be noted that this alternate embodiment of the furnace has a relatively shallow construction which is effective in operation with the forced convection heating described.

Figure 5:
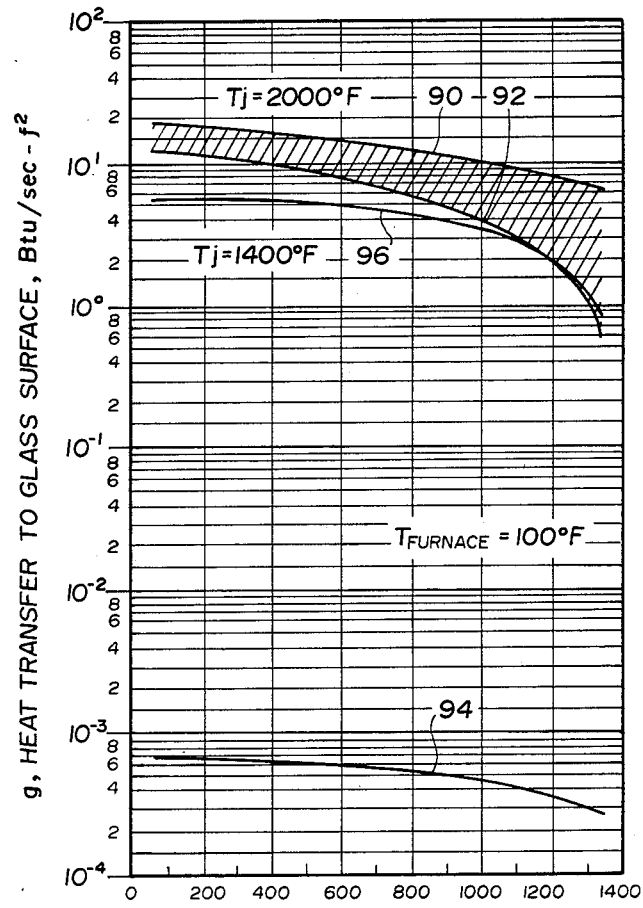
FIG. 5 is a graph that illustrates glass sheet heating in accordance with the present invention.

As illustrated in FIG. 5, the heat transfer that takes place by forced convection heating in accordance with the invention provides the dominant mode of heat transfer to the glass sheet. In other words, the forced convection heating provides at least 50% of the heating of the glass sheet. Preferably, the amount of forced convection heating is much greater, at least ⅔ to ¾ of the total heating. As illustrated by lines 90 and 92, the extent of forced convection heat transfer in accordance with this invention is much, much greater by several orders of magnitude than the heat transfer involved with natural convection as illustrated by line 94. Likewise, the forced convection heat transfer is significantly greater than the radiant heat transfer as illustrated by line 96 until the glass temperature exceeds 1200 degrees Fahrenheit which is the upper temperature extreme to which glass sheet heating is normally performed during processing. The extent of the forced convection heating depends upon the temperature $T_j$ of the products of combustion upon exiting through the burner outlets 46 (FIG. 4) as previously described. As illustrated by line 90 in FIG. 5, the extent of the heat transfer is greater when there is a higher temperature with little excess air supplied to the burners. A greater introduction of excess air as illustrated by line 92 decreases the temperature $T_j$ of the products of combustion and thereby decreases the extent of the forced convection heating. In order to accomplish the dominant forced convection heating of glass sheets, the supply pressure of gas and air to the burner illustrated were between about five and twenty five psi which is almost an order of magnitude greater than pressures which have previously been utilized. Also, the outlet pressures can be varied considerably while still having smooth combustion in the burners as a result of the burner construction disclosed.

Figure 8:
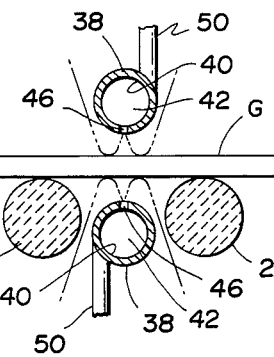
FIG. 8 is a sectional view that illustrates the closely spaced relationship of the burner outlets to a conveyed glass sheet.

As shown in FIG. 8, both embodiments have the combustion members of the upper and lower sets of burners positioned relatively close to the conveyed glass sheets G, i.e. spaced no more than about ⅜ inch or 1 cm. from the adjacent glass surface. More specifically, when the outlets 46 are round, the spacing between the outlets and the adjacent glass surface should be no more than about six times the diameter of the outlets. This closely spaced relationship permits the forced convection heating to provide the dominant mode of heat transfer to the conveyed glass sheets. Also, the spaced relationship of the burners with respect to each other along the length of the conveyor allows the gas flows to impinge with the glass surfaces and then freely flow back away from the glass sheet without any back pressure inhibiting the gas flow and the effectiveness of the forced convection heating.

As previously described in connection with the furnace 12 illustrated in FIGS. 1 and 2, the glass sheet which has been processed while conveyed on the rolls 22 of the roller conveyor 18 and subsequently cooled has improved characteristics as compared to glass sheets heated primarily by radiant heat. The glass sheet G will have reduced roll-wave distortion since the uniform heating achieved with gas burner supplied forced convection does not cause the edges of the glass sheet to be overheated relative to the center of the glass sheet. Likewise, there will be reduced edge distortion since the top and bottom surfaces will be heated to the same extent as each other and the edges will not curl downwardly upon cooling as previously took place with radiant heating. These advantages occur by virtue of the glass sheet having been heated by the gas burner supplied forced convection as the dominant mode of heat transfer to the glass sheet during the conveyance on the rolls of the conveyor. As such, while the forced convection has general utility regardless of the type of conveyor utilized, it will be appreciated that the forced convection heating as the dominant mode has particular utility when utilized with roller conveyors.

While the best modes for carrying out the invention have been described in detail, those familiar with the art to which this invention relates will recognize various alternative ways of practicing the invention as defined by the following claims.

What is claimed is:

1. A glass sheet heater comprising: a roller conveyor for engaging and conveying flat glass sheets along a horizontally extending plane of conveyance; a plurality of gas burners positioned along the length of the conveyor in upper and lower sets; the burners of each set being spaced from each other; each gas burner including an elongated combustion chamber in which combustion takes place; the elongated combustion chambers extending transversely to the direction of conveyance; and each combustion chamber having outlets positioned relatively close to the conveyed glass sheets to permit the products of combustion to flow outwardly from the combustion chamber to supply a heated gas flow that impinges on the conveyed glass sheets in order to provide forced convection that is the dominant mode of heat transfer to the conveyed glass sheets.

2. A glass sheet heater as in claim 1 wherein the upper and lower sets of gas burners include adjustable supplies of gas and air to independently control the extent the upper and lower glass surfaces are heated.

3. A glass sheet heater as in claim 2 wherein each burner includes a combustion member having an inner surface defining the combustion chamber thereof, at least one inlet through which gas and air are introduced into the combustion chamber in a tangential relationship with respect to the inner surface to provide a swirling motion that mixes the gas with the air within the chamber for combustion, and the heated gas flow from the chamber being discharged through the outlets thereof to impinge with and heat the conveyed glass sheets.

4. A glass sheet heater as in claim 3 wherein the combustion member of each burner comprises an elongated combustion tube whose inner surface has a round cross-section, the combustion tube having a plurality of the inlets spaced along its length, the combustion tube also having a plurality of outlets spaced along its length in a staggered relationship with respect to the inlets, and the number of outlets being greater than the number of inlets such that each inlet supplies gas and air for combustion and delivery through more than one outlet.

5. A glass sheet heater as in claim 4 wherein there are at least twice as many outlets as inlets for the combustion chamber of each burner, and the inlets and outlets being positioned in the staggered relationship such that each inlet supplies gas and air for combustion and delivery through at least one associated outlet and also supplies gas and air for combustion and delivery through at least one other outlet along with gas and air supplied therefor by an adjacent inlet.

6. A glass sheet heater as in claim 4 wherein there are three times as many outlets as inlets for the combustion chamber of each burner, and the inlets and outlets being positioned in a staggered relationship such that each inlet supplies gas and air for combustion and delivery through two associated outlets and also supplies gas and air for combustion and delivery through two other outlets along with gas and air supplied for the two other outlets by the two adjacent inlets.

7. A glass sheet heater as in claim 4, 5, or 6 wherein each burner further comprises a plurality of supply tubes for respectively supplying gas and air to the inlets of the combustion chamber, and each burner also including a manifold that feeds gas and air to the supply tubes for flow to the combustion chamber.

8. A glass sheet heater as in claim 7 which includes a furnace defining a heating chamber through which the conveyor extends and in which the burners are received, and the manifold of each burner including insulation for controlling heat flow to the gas and air being supplied thereby for subsequent combustion.

9. A glass sheet heater as in claim 7 which includes a furnace defining a heating chamber through which the conveyor extends and in which the combustion tube of each gas burner is received, the supply tubes of each gas burner extending from the combustion tube thereof out of the furnace, and the manifold of each burner being located externally of the furnace to control heat flow to the gas and air being supplied thereby for subsequent combustion.

10. A glass sheet heater as in claim 7 wherein the manifold of each burner includes an outer member into which the supply tubes extend, an inner member received within the outer member and having openings located in proximity to the supply tubes, an inlet for supplying gas to one of the members of the manifold, and an inlet for supplying air to the other member of the manifold such that the supply tubes feed both gas and air from the manifold to the combustion chamber.

11. A glass sheet heater as in claim 10 wherein the inner member of the manifold includes the gas inlet and the outer member thereof includes the air inlet, and the gas inlet of the inner member feeding gas to each supply tube within a concentric blanket of air fed thereto from the air inlet of the outer member to thereby prevent premature ignition before reaching the combustion chamber.

12. A process for heating a glass sheet comprising: conveying the glass sheet by a roller conveyor along a horizontal plane of conveyance between upper and lower sets of gas burners spaced from each other along the length of the conveyor and positioned relatively close to the plane of conveyance; and burning gas within an elongated combustion chamber of each burner with the elongated shape of the combustion chamber extending transversely to the direction of conveyance to supply heated gas flow through outlets of the elongated combustion chamber toward the plane of conveyance to impinge on the glass surfaces in order to provide forced convection that is the dominant mode of heat transfer to the conveyed glass sheet.

13. A process as in claim 12 wherein the upper and lower sets of gas burners are aligned with each other and located between the conveyor rolls.

14. A process as in claim 13 wherein gas and air are supplied to the combustion chamber of each burner in a tangential relationship to the combustion chamber to provide a swirling motion that mixes the gas and air for combustion.

15. A glass sheet heater comprising: a furnace; a roller conveyor that extends through the furnace and engages and conveys flat glass sheets along a horizontally extending plane of conveyance; a plurality of gas burners positioned along the length of the conveyor in upper and lower sets; the burners of each set being spaced from each other; each gas burner including an elongated combustion chamber in which combustion takes place; and each combustion chamber being located within the furnace with its elongated shape extending transversely to the direction of conveyance and having outlets positioned relatively close to the conveyed glass sheets to permit the products of combustion to flow outwardly from the combustion chamber and supply a heated gas flow that impinges on the conveyed glass sheets in order to provide forced convection that is the dominant mode of heat transfer to the conveyed glass sheets.

16. A glass sheet heater comprising: a furnace; a roller conveyor that extends through the furnace and engages and conveys flat glass sheets along a horizontally extending plane of conveyance; a plurality of gas burners positioned along the length of the conveyor in upper and lower sets; the burners of each set being spaced from each other; each gas burner including a combustion member located within the furnace and having an inner surface defining an elongated combustion chamber in which combustion takes place; and each combustion chamber extending transversely to the direction of conveyance and having outlets positioned relatively close to the conveyed glass sheets to permit the products of combustion to flow outwardly from the combustion chamber and supply a heated gas flow that impinges on the conveyed glass sheet in order to provide forced convection that is the dominant mode of heat transfer to the conveyed glass sheets.

17. A glass sheet heater comprising: a furnace; a roller conveyor that extends through the furnace and engages and conveys flat glass sheets along a horizontally extending plane of conveyance; a plurality of gas burners positioned along the length of the conveyor in upper and lower sets; the burners of each set being spaced from each other; each gas burner including a combustion member located within the furnace and having an inner surface defining an elongated combustion chamber in which combustion takes place; each combustion chamber having its elongated shape extending transversely to the direction of conveyance and including at least one inlet through which gas and air are introduced into the combustion chamber in a tangential relationship with respect to the inner surface to provide a swirling motion that mixes the gas with the air within the chamber for combustion; and each combustion chamber having outlets positioned relatively clsoe to the conveyed glass sheets to permit the products of combustion to flow outwardly from the combustion chamber and supply a heated gas flow that impinges on the conveyed glass sheet in order to provide forced convection that is the dominant mode of heat transfer to the conveyed glass sheets.

* * * * *

UNITED STATES PATENT AND TRADEMARK OFFICE
CERTIFICATE OF CORRECTION

PATENT NO. : 4,738,705

DATED : April 19, 1988

INVENTOR(S) : Harold A. McMaster

It is certified that error appears in the above-identified patent and that said Letters Patent is hereby corrected as shown below:

Column 4, Line 5, after "The" delete --of--.

Column 8, Line 50, "45" should be --46--.

Column 14, Line 41, Claim 17, "clsoe" should be --close--.

Signed and Sealed this

Thirtieth Day of July, 1991

Attest:

HARRY F. MANBECK, JR.

*Attesting Officer*    *Commissioner of Patents and Trademarks*